United States Patent
Olah et al.

[11] Patent Number: 5,928,806
[45] Date of Patent: Jul. 27, 1999

[54] RECYCLING OF CARBON DIOXIDE INTO METHYL ALCOHOL AND RELATED OXYGENATES FOR HYDROCARBONS

[76] Inventors: George A. Olah, 2252 Gloaming Way, Beverly Hills, Calif. 90210; G. K. Surya Prakash, 1946 Deerpeak Dr., Hacienda Heights, Calif. 91745

[21] Appl. No.: 09/072,585

[22] Filed: May 5, 1998

Related U.S. Application Data

[60] Provisional application No. 60/046,335, May 7, 1997.

[51] Int. Cl.[6] .................................................. H01M 8/18
[52] U.S. Cl. ............................ 429/13; 429/21; 204/DIG. 4
[58] Field of Search .................. 429/13, 21; 204/DIG. 4; H01M 8/18

[56] References Cited

U.S. PATENT DOCUMENTS

| | | | |
|---|---|---|---|
| 3,013,908 | 12/1961 | Luck et al. | 117/142 |
| 3,113,049 | 12/1963 | Worsham | 136/86 |
| 3,427,235 | 2/1969 | Le Duc | 429/13 X |
| 3,839,091 | 10/1974 | Bloomfield et al. | 136/86 |
| 3,959,094 | 5/1976 | Steinberg | 204/77 |
| 4,262,063 | 4/1981 | Kudo et al. | 429/41 |
| 4,390,603 | 6/1983 | Kawana et al. | 429/30 |
| 4,407,905 | 10/1983 | Takeuchi et al. | 429/42 |
| 4,474,652 | 10/1984 | Brown et al. | 204/59 |
| 4,478,917 | 10/1984 | Fujita et al. | 429/33 |
| 4,537,840 | 8/1985 | Tsukui et al. | 429/33 |
| 4,562,123 | 12/1985 | Shimizu et al. | 429/27 |
| 4,609,441 | 9/1986 | Frese et al. | 204/77 |
| 4,612,261 | 9/1986 | Tsukui et al. | 429/13 |
| 4,629,664 | 12/1986 | Tsukui et al. | 429/33 |
| 4,657,829 | 4/1987 | McElroy et al. | 429/21 X |
| 4,673,473 | 6/1987 | Ang et al. | 204/59 |
| 5,306,577 | 4/1994 | Sprouse | 429/21 X |
| 5,342,702 | 8/1994 | MacGregor | 429/21 X |
| 5,376,470 | 12/1994 | Sprouse | 429/19 |
| 5,492,777 | 2/1996 | Isenberg et al. | 429/17 |
| 5,599,638 | 2/1997 | Surampudi et al. | 429/33 |

OTHER PUBLICATIONS

Eyring, H. et al., *J. Phys. Chem.*, 76(22), 3278–3286 (1972). (Month Unknown).
Frese, K.W., Jr., in *Electrochemical and Electrocatalytic Reactions of Carbon Dioxide* (Krist, K. et al., eds.), 145–216 (1993). (month N/A).
Halmann, M., *Nature*, 275, 115–116 (1978). (Month Unknown).
Hori, Y. et al., *J. Faculty Eng. Chiba Univ.*, 37–40 (1981). (Month Unknown).
Kapusta, S. et al., *J. Electrochem. Soc.*, 130(3), 607–613 (1983). (Month Unknown).

*Primary Examiner*—Stephen Kalafut
*Attorney, Agent, or Firm*—Pennie & Edmonds LLP

[57] ABSTRACT

A regenerative electrochemical cell system based on a fuel cell to oxidize methyl alcohol or other oxygenated hydrocarbons coupled with a regenerative cell to reduce carbon dioxide to form oxygenated hydrocarbons is disclosed. Methods to reversibly interconvert oxygenated hydrocarbons and carbon dioxide, to recycle carbon dioxide produced as a by-product of industrial processes, and to store and release electrical and chemical energy are also disclosed.

21 Claims, 1 Drawing Sheet

RECYCLING OF CARBON DIOXIDE INTO METHYL ALCOHOL AND RELATED OXYGENATES FOR HYDROCARBONS

CROSS-REFERENCE TO RELATED APPLICATIONS

This application claims the benefit of Provisional Application No. 60/046,335, filed May 7, 1997.

FIELD OF THE INVENTION

The present invention relates to a method of reducing carbon dioxide to form organic compounds, methods of using the reversible reduction of carbon dioxide to provide an energy storage and release system, and a regenerative fuel cell system therefor.

Background of the Invention

The world's growing population and increasingly technological society have made it difficult for the world's energy and material resources to keep pace. New and more efficient ways are needed to satisfy demands, so that the standard of living can be maintained or improved. As our resource demands need to be satisfied while safeguarding the environment for use by future generations, establishing an equilibrium between providing these needed resources and protecting and improving the environment is one of the major challenges of society.

Combustion of fossil fuels such as coal, oil or natural gas (i.e., hydrocarbons), widely used in power plants to generate electricity and in many other industrial applications, produces carbon dioxide and water. Whereas the photosynthetic process recycles carbon dioxide and water into carbohydrates and thus new plant life, the formation of fossil fuels in nature does not proceed on a useful time scale. For all practical purposes, combustion of fossil fuels is an irreversible process.

In addition, the carbon dioxide produced by combustion of hydrocarbons in power plants and other industries contributes to the greenhouse warming effect and causes further environmental concerns. Recycling of carbon dioxide into useful fuels would not only help to alleviate the problem of our diminishing hydrocarbon resources, but at the same time would also help to mitigate this serious environmental hazard.

In order to convert carbon dioxide to oxygenated hydrocarbons, a source of hydrogen is needed. Although sea water contains an unlimited source of hydrogen, methods of hydrogenating carbon dioxide have in the past required hydrogen in the form of $H_2$ gas rather than bound with oxygen in $H_2O$. Thus, it has been necessary to split water into its component elements, hydrogen and oxygen gasses.

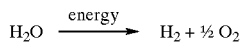

Typically, the energy necessary to split water has been electrical energy (electrolysis).

Electrolysis, however, remains problematic. The availability of safer and cleaner atomic energy, as well as alternative energy sources, may eventually provide the needed electricity for electrolysis of water at an environmentally and economically acceptable price. For example, the use of photovoltaic solar energy is possible in suitable locations. In addition, energy of the wind, waves, tides and other alternative energy sources can potentially be used in the future to obtain hydrogen from water.

At present, considerable energy is wasted due our inability to store electricity efficiently. Existing power plants, either burning fossil fuels or using atomic energy, have substantial excess capacity in off peak periods. They thus can produce needed electricity for electrolysis of water to provide the hydrogen needed to catalytically reduce $CO_2$ to oxygenated hydrocarbons or hydrocarbon fuels and products. This indirectly allows storage of electricity and using it to recycle carbon dioxide into useful fuels, which in turn can be used for energy generation. However, it would be advantageous, and more energy efficient, to eliminate the electrolysis step entirely and directly recycle carbon dioxide and water to form hydrocarbons.

It is known that aqueous $CO_2$ can be electrocatalytically reduced to produce formic acid, formaldehyde and methyl alcohol. Early reports of the electrochemical reduction of carbon dioxide date back to the 1870s, although the process only gained recent interest when Halmon demonstrated that aqueous carbon dioxide could be reduced on semiconductor surfaces such as p-type gallium phosphide to produce formic acid, formaldehyde and methyl alcohol in a photoassisted electrolytic reduction reaction. (See, Halmon, M., *Nature*, 275, 115 (1978), and references cited therein). The process, however, produced very low current densities (on the order of several $mA/cm^2$) and required high overvoltages.

Hori has shown that carbon dioxide can be electrochemically reduced on a variety of metals and observed the following activity: indium>tin>zinc>lead>copper>gold. Hori, Y., Kamide, N. and Suzuki, S., *J. Faculty Eng. Chiba Univ.*, 32, 37 (1981).

Hackerman discloses the reduction of carbon dioxide on tin and indium cathodes in a potassium chloride-sodium bicarbonate solution. Kapusta, S. and Hackerman, N., *J. Electrochem. Soc.*, 130, 607 (1983). A current efficiency of 90% for formic acid generation was reported. Current efficiencies as high as 100% have been reported for the reduction of $CO_2$ to formate ion on mercury cathodes, with current densities ranging from $10^{-7}$ to $10^{-2}$ $A/cm^2$. Ryu, J., Anderson, T. and Eyring, H., *J. Phys. Chem.*, 76, 3278 (1972). Frese has reported a number of different metals for carbon dioxide reduction, with the largest current efficiencies observed at 78% for the production of methyl alcohol on silver and about 100% for methyl alcohol on carbon. Frese, K. W., Jr., in *Electrochemical and Electrocatalytic Reactions of $CO_2$*, Christ et al. (eds.), p. 166 (1993).

None of these references, however, describes an electrochemical reduction of carbon dioxide that is practical as a method of recycling carbon dioxide to produce usable amounts of methyl alcohol and related hydrocarbons. When aqueous $CO_2$ is electrochemically reduced, the large overvoltage required in many conventional systems results in competition with one of several hydrogen evolution reactions (depending on the pH of the solution). Electrode materials, therefore, must be chosen to minimize the rate of hydrogen evolution, and the current densities achieved have been impractically low.

Several patents have been granted for methods of $CO_2$ reduction. U.S. Pat. No. 3,959,094 discloses a method of synthesizing methyl alcohol from $CO_2$ by electrolyzing a potassium carbonate solution. $CO_2$ is first absorbed by a potassium hydroxide solution to produce potassium carbonate

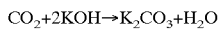

The potassium carbonate solution is then electrolyzed to form methyl alcohol and potassium hydroxide, which must then be separated.

$$K_2CO_3 + 3H_2O \rightarrow CH_3OH + 2KOH + 3/2\, O_2$$

U.S. Pat. No. 4,474,652 discloses an electrochemical process for producing carboxylic acids, including formic and oxalic acids, by reduction of $CO_2$ using a gas transfer electrode. Similarly, U.S. Pat. No. 4,673,473 discloses a process for reducing $CO_2$ to oxalate, formate and formaldehyde using high catalytic surface area porous gas diffusion electrodes.

U.S. Pat. No. 4,609,441 discloses a method of reducing $CO_2$ to methyl alcohol without high overvoltages, using a molybdenum electrode in solutions of sodium sulfate or sulfuric acid. However, current densities achieved were only in the $\mu A/cm^2$ range.

In addition, it would be desirable to utilize methyl alcohol produced by $CO_2$ reduction in conjunction with a complementary methyl alcohol oxidation fuel cell to provide a methyl alcohol/$CO_2$ based regenerative fuel cell system. Such a system would thus allow utilization of excess capacity electrical energy and undesirable $CO_2$ emissions, while providing an effective energy storage system.

Past efforts to produce regenerative fuel cells have focussed largely on systems based on electrolysis of water in conjunction with a hydrogen/oxygen fuel cell, as in, for example, U.S. Pat. No. 3,839,091. U.S. Pat. Nos. 5,376,470 and 5,492,777 similarly disclose regenerative fuel cells utilizing hydrolysis-$H_2/O_2$ energy systems. None of these regenerative fuel cell systems, however, operate on a methyl alcohol/$CO_2$ cycle. Additionally, the $H_2/O_2/H_2O$ systems suffer from the disadvantages inherent in using these gasses.

Thus, there remains a need for a new way to produce methyl alcohol and derived oxygenates or hydrocarbons by chemically recycling carbon dioxide, and new forms of regenerative fuel cells to efficiently store chemical and electrical energy.

SUMMARY OF THE INVENTION

In one aspect, the present invention provides a regenerative fuel cell system including a first electrochemical cell to oxidize an oxygenated hydrocarbon to carbon dioxide and water, and a second electrochemical cell to reduce carbon dioxide to an oxygenated hydrocarbon and oxygen. The two electrochemical cells are in fluid communication with each other such that the reaction products of each cell are transferred to the other cell for use as reagents. Preferably, the first electrochemical cell is a liquid feed fuel cell, and the second electrochemical cell is a reversed liquid feed fuel cell; i.e., a liquid feed fuel cell operated in the reverse direction and consuming, rather than producing energy. The oxygenated hydrocarbons can be methyl alcohol, methyl formate, formaldehyde or formic acid.

In another aspect, the present invention includes a method of reversibly interconverting oxygenated hydrocarbons and carbon dioxide by oxidizing an oxygenated hydrocarbon to carbon dioxide and water in a first zone, and reducing a mixture of carbon dioxide and water to an oxygenated hydrocarbon, preferably the same compound, in a second zone. The two zones are in fluid communication with each other such that the products of the reactions in each zone are transferred to the other zone for use as reagents. The oxygenated hydrocarbon can be methyl alcohol, methyl formate, formaldehyde or formic acid. The reducing step consumes electrical energy, which is provided to the second zone from the off-peak production of a power plant. The off-peak energy is thus effectively stored, and can be recovered when needed by recovering the electrical energy produced in the first zone.

In another aspect, the present invention includes a method of reducing carbon dioxide to form an oxygenated hydrocarbon by providing carbon dioxide, water and electrical energy to a reduction zone such that the carbon dioxide and water react to form oxygen and the oxygenated hydrocarbon. The oxygenated hydrocarbon can be methyl alcohol, formaldehyde, formic acid or methyl formate. The carbon dioxide can be obtained as an industrial by-product, thus providing a means to recycle carbon dioxide that would otherwise be released as an atmospheric pollutant to form useful organic compounds. The electrical energy used is preferably obtained from the off-peak production of a power plant.

In yet another aspect, the present invention includes a method of storing electrical energy as chemical energy and recovering electrical energy from the stored chemical energy, using the regenerative fuel cell system. In an energy storage mode, electrical energy is provided to the second electrochemical cell to drive the reduction of carbon dioxide, and the oxygenated hydrocarbon and oxygen thus produced are transferred to the first cell. In an energy recovery mode, the oxygenated hydrocarbon in the first electrochemical cell is oxidized, the carbon dioxide and water thus produced are transferred to the second electrochemical cell, and the electrical energy thus produced is recovered.

DETAILED DESCRIPTION OF THE INVENTION

Figure 1:
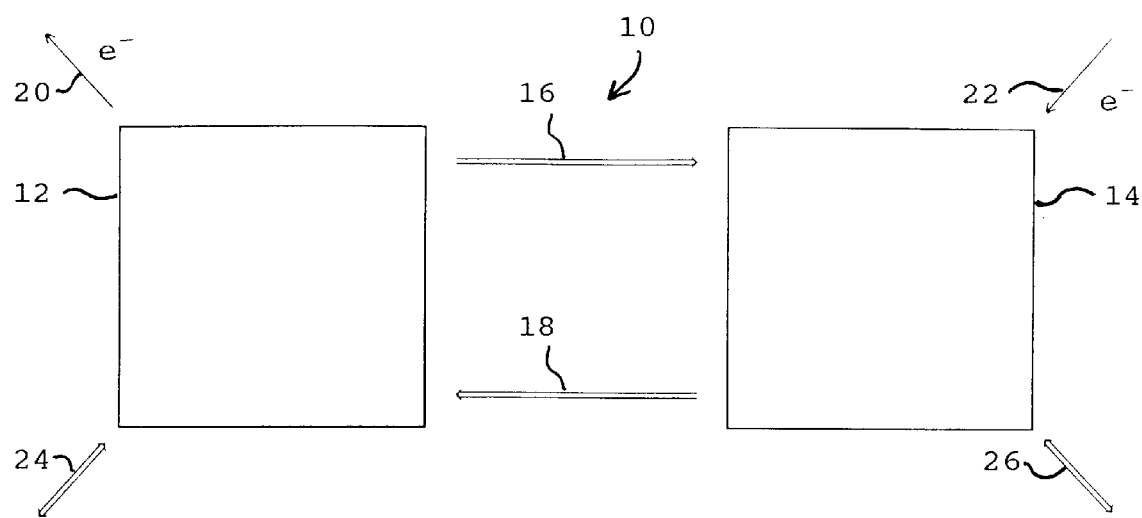
FIG. 1 shows a schematic representation of a regenerative electrochemical cell system according to the invention.

In one aspect, the present invention includes a new way to produce methyl alcohol and related oxygenates directly from carbon dioxide. The reduction is accomplished as an aqueous electrocatalytic reduction, without the need for prior electrolysis of water. In the direct oxidation liquid feed fuel cell disclosed in our U.S. Pat. No. 5,559,638, methyl alcohol reacts with oxygen or air in the presence of a suitable metal catalyst to produce electricity while forming $CO_2$ and $H_2O$.

$$CH_3OH + 1.5\, O_2 \xrightarrow{6e^-} CO_2 + 2\, H_2O$$

In accordance with the present invention, it is surprisingly found that the oxidation of methyl alcohol can be reversed in the liquid feed fuel cell to reduce $CO_2$ with water in the presence of a suitable metal catalyst.

$$CO_2 + 2\, H_2O \xrightarrow{6e^-} CH_3OH + 1.5\, O_2$$

Thus, in the method of the present invention, carbon dioxide, water and electrical energy are supplied to the cathode of the fuel cell described in the '638 patent; i.e., the fuel cell of the '638 patent is operated in the reverse direction to reduce $CO_2$.

The electrocatalytic reduction of $CO_2$ in the reversed fuel cell directly produces methyl alcohol and related compounds. Although the reaction as shown above produces methyl alcohol, it should be understood that related oxygenated hydrocarbons, such as formaldehyde, formic acid, methyl formate, dimethoxymethane, trimethoxymethane, trioxymethylene, and dimethyl carbonate, are also readily produced according to the present method. The specific product formed depends on the cell potential applied. Thus, the appropriate cell potential to produce a desired product can be readily determined by one skilled in the art.

Advantageously, the reversed fuel cell accomplishes the electrocatalytic reduction of $CO_2$ outside of the potential range of the electrolysis of water.

The electrochemical reduction of carbon dioxide in accordance with the invention produces methyl alcohol and related oxygenated methane derivatives which are useful as fuels in direct oxidation liquid feed fuel cells, such as the cells disclosed U.S. Pat. No. 5,599,638. Thus, the method of the present invention provides a renewable carbon base to supplement and eventually replace our diminishing fossil fuel resources.

The carbon dioxide reduced in the present invention can be obtained from any available source. At present, carbon dioxide cannot be obtained economically by separation from atmospheric gasses, since the average carbon dioxide content of the atmosphere is very low (about 0.04%). However, it can be readily recovered from various sources, such as emissions of power plants burning carbonaceous fuels (coal, oil, natural gas), fermentation processes, calcination of limestone, or other industrial sources.

When recycling $CO_2$ into methyl alcohol, dimethyl ether subsequently can be readily obtained by a simple bimolecular dehydration process.

Further catalytic dehydration of dimethyl ether gives ethylene.

The overall conversion of carbon dioxide into ethylene thus is the following:

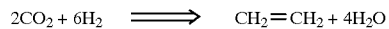

Further reaction of ethylene to produce propylene is also known.

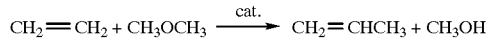

These transformations can be carried out using supported bifunctional acid-base catalysts as described in U.S. Pat. No. 4,373,109, or over various zeolite catalysts.

Ethylene as well as propylene produced from carbon dioxide allows ready preparation of a whole array of aliphatic (including gasoline) and aromatic hydrocarbons, as well as their derivatives.

In another aspect, the present invention relates to a regenerative electrochemical cell, or regenerative fuel cell, based on the $CO_2/CH_3OH$ electrochemical system (or related oxygenated hydrocarbons, as described above).

Referring to FIG. 1, the regenerative fuel cell system 10 includes a first electrochemical cell 12 and a second electrochemical cell 14. The first electrochemical cell 12 is a liquid feed fuel cell as described in U.S. Pat. No. 5,599,638, the disclosure of which is incorporated herein by reference.

In the first electrochemical cell 12, an oxygenated hydrocarbon such as methyl alcohol, formic acid, formaldehyde or methyl formate is oxidized to form carbon dioxide and water. In the second electrochemical cell 14, carbon dioxide is reduced to form an oxygenated hydrocarbon, such as methyl alcohol, formic acid, formaldehyde or methyl formate. Preferably, the oxygenated hydrocarbon oxidized in the first electrochemical cell 12 and the oxygenated hydrocarbon produced by the reduction reaction in the second electrochemical cell 14 are the same compound. Most preferably, the oxygenated hydrocarbon is methyl alcohol.

The second electrochemical cell 14 can be any electrochemical cell which can be operated to accomplish the carbon dioxide reduction. Preferably, the second electrochemical cell 14 is the reversed liquid feed fuel cell of the '638 patent.

The first and second electrochemical cells 12 and 14 are in fluid communication with each other, as shown schematically by the arrows 16 and 18. Thus, carbon dioxide and water produced in the first electrochemical cell 12 are provided to the second electrochemical cell 14, as represented by 16. Similarly, methyl alcohol or the related oxygenated hydrocarbon and oxygen produced in the second electrochemical cell 14 are provided to the first electrochemical cell 12, as represented by 18.

The regenerative fuel cell 10 further includes electrical output means 20, for recovering electrical energy produced by the oxidation of methyl alcohol or the related oxygenated hydrocarbon in the first electrochemical cell 12, and electrical input means 22, for providing electrical energy to carry out the carbon dioxide reduction reaction in the second electrochemical cell 14. Such electrochemical output means 20 and electrochemical input means 22 can be any suitable means to receive and supply electrical energy, and these are well known in the art.

The regenerative fuel cell system also includes first and second transfer means 24 and 26 by which chemical components may be added or removed as needed. Thus, for example, additional methyl alcohol and/or oxygen reagents may be added to the first electrochemical cell 12 as needed, or some or all of the $CO_2$ and/or $H_2O$ products removed, through the first transfer means 24. Similarly, the second transfer means 26 allows for adding $CO_2$ and/or water from an external source, and/or removing methyl alcohol and/or oxygen products. Such transfer means are well known in the art.

In another aspect, the present invention relates to methods of storing electrical energy as and recovering electrical energy from chemical energy, using the regenerative electrochemical cell system 10 of the present invention. In an energy storage mode, electrical energy is provided to the electrical input means 22 of the second electrochemical cell 14, thus driving the cell reaction in the reverse (non-spontaneous) direction to produce methyl alcohol and/or related oxygenated compounds. The chemical products of this reduction reaction, e.g. methyl alcohol and oxygen, are then provided to the first electrochemical cell 12.

In an energy recovery mode, methyl alcohol or a related oxygenated hydrocarbon is oxidized in the first electrochemical cell 12 to generate electricity, and the products of the reaction, carbon dioxide and water, are provided to the second electrochemical cell 14. The system thus acts as a reversible storage device for electric power. As electricity can still not be stored efficiently in batteries, the use of the regenerative electrochemical cell effectively acting as a rechargeable device running on methyl alcohol or its derivatives made from recycling of carbon dioxide, provides not only a highly efficient clean power source but at the same time helps to diminish atmospheric build-up of carbon dioxide, a harmful greenhouse gas.

It should be appreciated that the storage and recovery method can proceed in either direction. The first electrochemical cell can be provided with the organic fuel and the reaction driven to produce electricity, thereby providing the second electrochemical cell with $CO_2$ and water. Alternatively, the second electrochemical cell can be provided with $CO_2$ and water and electrical energy provided to drive the reaction, thereby providing the first electrochemical cell with methyl alcohol (for example) and oxygen.

In a preferred embodiment, carbon dioxide is recovered as an industrial by-product, By "industrial by-product" is meant from industrial sources, such as power plants and other hydrocarbon-consuming sources, calcination of limestone, fermentation processes and other industrial processes which generate carbon dioxide. The recovered carbon dioxide is provided through the second transfer means 26 to the second electrochemical cell 14 for conversion to methyl alcohol or related compounds. The methyl alcohol thus produced can be transferred to the first electrochemical cell and/or recovered externally for storage or other use. In another aspect of the preferred embodiment, the electrical energy provided to the second electrochemical cell 14 is provided by recovering off-peak electrical power from power plants with excess capacity.

The regenerative fuel cell system can also be a single electrochemical cell wherein both the oxidation of fuels (i.e., production of electric power) and reduction of $CO_2$ (to obtain fuels) can be carried out by operating the cell in a forward or reverse direction.

In still another aspect, the present invention includes methods of reversibly interconverting hydrocarbons and carbon dioxide. According to this method, methyl alcohol or related oxygenated compound such as those described above, is oxidized to carbon dioxide and water in a first zone, and carbon dioxide and water are reduced to methyl alcohol (or a related oxygenated compound) and oxygen in a second zone. The first and second zones are in fluid communication with each other such that the carbon dioxide and water produced in the first zone are provided to the second zone, and the methyl alcohol and oxygen produced in the second zone are provided to the first zone. The reducing step in the second zone consumes electrical energy, which may be provided by any suitable source, but preferably is provided by off-peak electrical power plant production.

The reduction of carbon dioxide involves two electron reduction steps which can ultimately lead to the fully reduced product, methane. The standard reduction potentials for these processes are listed in Table 1.

TABLE 1

Standard Reduction Potentials

| Half Reaction | | | $E^0$ vs. SHE* |
|---|---|---|---|
| $CO_2 + 2H^+ + 2e^-$ | ⇌ | HCOOH | −0.11 V |
| $CO_2 + 2H^+ + 2e^-$ | ⇌ | $CO + H_2O$ | −0.10 V |
| $CO_2 + 4H^+ + 4e^-$ | ⇌ | $CH_2O + H_2O$ | −0.028 V |
| $CO_2 + 6H^+ + 6e^-$ | ⇌ | $CH_3OH + H_2O$ | +0.031 V |
| $CO_2 + 8H^+ + 8e^-$ | ⇌ | $CH_4 + 2H_2O$ | +0.17 V |

*Standard Hydrogen Electrode

It is believed that, in aqueous solutions, carbon dioxide is first reduced to the $CO_2^-$. radical anion (estimates for its standard reduction potential are about −1.89 V versus the saturated calomel electrode (SCE)), which is further reduced in the presence of water to HCOO.+HO. and then to $HCOO^-$. Although the standard reduction potentials for the various $CO_2$ reduction reactions are small, the large overpotentials observed on metals is most likely due to the formation of the radical anion intermediate. Improvements in carbon dioxide electrocatalysts will further lower the overpotential on metals while maintaining high current efficiencies and high current densities (>100 mA/cm$^2$).

Certain embodiments and features of the invention are illustrated, and not limited, by the following working example.

Example: Electrochemical Reduction of $CO_2$

For the aqueous electrochemical reduction of $CO_2$, the water oxidation pathway is utilized in the reversed fuel cell described in U.S. Pat. No. 5,599,638. Using the described electrochemical cell, $CO_2$ is reduced on the cathode on many metals such as Sn, In, Bi, Sb, Cd, Zn, Cu, Pb, Ga, Ag, Au, Ni, Fe, Pd, Wo, Pt, and Mo, deposited on carbon. The water oxidation at the anode is achieved on a Pt/C electrode. The metal catalysts at the cathode work to different extents in reducing $CO_2$ giving products ranging from formic acid to methane. Silver/carbon electrodes are the most useful to give methyl alcohol in high selectivity. The cell voltage of the system is equal to the difference in the cathode and the anode over-potentials and iR drop, which results in a cell voltage on the order of 2 volts for an oxygen evolving anode involving platinum on carbon. Cu/Pd electrode is suited for the formation of formic acid in 70% Faradaic efficiency at a potential of −1.6 V versus SCE.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

All references cited in the present application are incorporated by reference in their entirety.

What is claimed is:

1. A regenerative fuel cell system comprising:
    a first electrochemical cell to oxidize an oxygenated hydrocarbon to carbon dioxide and water and having electrical output means for recovering electrical energy produced thereby; and
    a second electrochemical cell to reduce carbon dioxide and water to the oxygenated hydrocarbon and oxygen and having electrical input means for providing electrical energy thereto;
    wherein the first and second electrochemical cells are in fluid communication with each other such that the carbon dioxide and water produced in the first cell are provided to the second cell, and the oxygenated hydrocarbon and oxygen produced in the second cell are provided to the first cell.

2. The regenerative fuel cell system of claim 1, wherein the first electrochemical cell is a liquid feed fuel cell.

3. The regenerative fuel cell system of claim 1, wherein the second electrochemical cell is a reversed liquid feed fuel cell.

4. The regenerative fuel cell system of claim 1, which further comprises first transfer means to add or remove components to or from the first electrochemical cell, and second transfer means to add or remove components to or from the second electrochemical cell.

5. A regenerative fuel cell system comprising:
a first electrochemical cell to oxidize a first oxygenated hydrocarbon to carbon dioxide and water and having electrical output means for recovering electrical energy produced thereby; and
a second electrochemical cell to reduce carbon dioxide to a second oxygenated hydrocarbon and oxygen and having electrical input means for providing electrical energy thereto;
wherein the first and second electrochemical cells are in-fluid communication with each other such that the carbon dioxide and water produced in the first cell are provided to the second cell, and the second oxygenated hydrocarbon and oxygen produced in the second cell are provided to the first cell;
wherein the first and second oxygenated hydrocarbons are selected from the group consisting of methyl alcohol, methyl formate, formaldehyde and formic acid.

6. The regenerative fuel cell system of claim 5, which further comprises first transfer means to add or remove components to or from the first electrochemical cell, and second transfer means to add or remove components to or from the second electrochemical cell.

7. A method of reversibly interconverting oxygenated hydrocarbons and carbon dioxide, which comprises:
oxidizing a first oxygenated hydrocarbon to carbon dioxide and water in a first zone; and
reducing a mixture of carbon dioxide and water to a second oxygenated hydrocarbon and oxygen in a second zone,
wherein the first and second zones are in fluid communication with each other such that the carbon dioxide and water produced in the first zone are provided to the second zone, the second oxygenated hydrocarbon and oxygen produced in the second zone are provided to the first zone, and the first and second oxygenated hydrocarbons are selected from the group consisting of methyl alcohol, methyl formate, formaldehyde and formic acid.

8. The method of claim 7, wherein the reducing step consumes electrical energy, and the method further comprises providing electrical energy to the second zone.

9. The method of claim 8, wherein the electrical energy provided to the second zone is obtained from off-peak production of a power plant.

10. The method of claim 7, wherein the oxidizing step produces electrical energy, and the method further comprises recovering the electrical energy thus produced.

11. A method of reversibly interconverting oxygenated hydrocarbons and carbon dioxide, which comprises:
oxidizing a first oxygenated hydrocarbon to carbon dioxide and water in a first zone; and
reducing a mixture of carbon dioxide and water to a second oxygenated hydrocarbon and oxygen in a second zone,
wherein the first and second zones are in fluid communication with each other such that the carbon dioxide and water produced in the first zone are provided to the second zone, the second oxygenated hydrocarbon and oxygen produced in the second zone are provided to the first zone, and the first and second oxygenated hydrocarbons are the same compound.

12. The method of claim 11 wherein the reducing step consumes electrical energy, and the method further comprises providing electrical energy to the second zone.

13. The method of claim 12, wherein the electrical energy provided to the second zone is obtained from off-peak production of a power plant.

14. The method of claim 11, wherein the oxidizing step produces electrical energy, and the method further comprises recovering the electrical energy thus produced.

15. A method of reducing carbon dioxide to form an oxygenated hydrocarbon, which comprises providing carbon dioxide, water and electrical energy to a reduction zone such that the carbon dioxide and water react to form oxygen and an oxygenated hydrocarbon or mixture of oxygenated hydrocarbons wherein the oxygenated hydrocarbon or mixture includes methyl alcohol, formaldehyde, formic acid or methyl formate.

16. The method of claim 15, wherein the carbon dioxide provided to the reduction zone is obtained as an industrial by-product.

17. The method of claim 15, wherein the electrical energy provided to the reduction zone is obtained from off-peak production of a power plant.

18. The method of claim 15, wherein the oxygenated hydrocarbon is methyl alcohol, and the method further comprises dehydrating the methyl alcohol to form dimethyl ether, and dehydrating the dimethyl ether to form ethylene.

19. A method of storing electrical energy as chemical energy and recovering electrical energy from the stored chemical energy, which comprises:
reversibly interconverting oxygenated hydrocarbons and carbon dioxide by oxidizing a first oxygenated hydrocarbon to carbon dioxide and water in a first zone; and reducing a mixture of carbon dioxide and water to a second oxygenated hydrocarbon and oxygen in a second zones wherein the first and second zones are in fluid communication with each other such that the carbon dioxide and water produced in the first zone are provided to the second zone, and the second oxygenated hydrocarbon and oxygen produced in the second zone are provided to the first zone; and
conducting the oxidizing and reducing steps in an energy storage mode and an energy recovery mode, wherein the energy storage mode comprises providing energy to the second zone, and transferring the second oxygenated hydrocarbon and oxygen thus produced to the first zone; and wherein the energy recovery mode comprises oxidizing the first oxygenated hydrocarbon in the first zone, transferring the carbon dioxide and water thus produced to the second zone, and recovering the electrical energy thus produced from the second zone.

20. A method of storing electrical energy as chemical energy and recovering electrical energy from the stored chemical energy, which comprises:
providing a regenerative fuel cell system comprising:
a first electrochemical cell to oxidize a first oxygenated hydrocarbon to carbon dioxide and water and having electrical output means for recovering electrical energy produced thereby; and
a second electrochemical cell to reduce carbon dioxide to a second oxygenated hydrocarbon and oxygen and having electrical input means for providing electrical energy thereto;
wherein the first and second electrochemical cells are in fluid communication with each other such that the carbon dioxide and water produced in the first cell are provided to the second cell, and the second oxygenated hydrocarbon and oxygen produced in the second cell are provided to the first cell; and operating the regenerative fuel cell system in an energy storage mode and an energy recovery mode, wherein the energy storage mode comprises providing electrical energy to the electrical input means of the second electrochemical cell to reduce carbon dioxide therein to the second oxygenated hydrocarbon and oxygen, and transferring the second oxygenated hydrocarbon and oxygen thus produced to the first cell; and wherein the energy recovery mode comprises oxidizing one of the first or second oxygenated hydrocarbons in the first electrochemical cell to form carbon dioxide and water, transferring the carbon dioxide and water thus produced to the second electrochemical cell, and recovering the electrical energy thus produced from the electrical output means.

21. The method of claim 20 wherein the first and second oxygenated hydrocarbons are the same compound.

* * * * *

UNITED STATES PATENT AND TRADEMARK OFFICE
CERTIFICATE OF CORRECTION

PATENT NO.    :   5,928,806

DATED         :   July 27, 1999

INVENTOR(S)  :   George A. OLAH et al.

It is certified that error appears in the above-identified patent and that said Letters Patent is hereby corrected as shown below:

Column 9, line 14: change "in-fluid" to --in fluid--.

Column 10, line 36: change "zones wherein" to --zone, wherein--.

Signed and Sealed this

Eighteenth Day of January, 2000

Attest:

Q. TODD DICKINSON

*Attesting Officer*    *Commissioner of Patents and Trademarks*